May 4, 1954

G. O. JOHNSON 2,677,447

CLUTCH TRIPPING MECHANISM FOR PUNCH
PRESSES AND OTHER MACHINE TOOLS

Filed Dec. 26, 1951

INVENTOR.
Gustaf O. Johnson
BY
Otto A. Earl
Attorney.

May 4, 1954 G. O. JOHNSON 2,677,447
CLUTCH TRIPPING MECHANISM FOR PUNCH
PRESSES AND OTHER MACHINE TOOLS
Filed Dec. 26, 1951 4 Sheets-Sheet 4

INVENTOR.
Gustaf O. Johnson
BY
Otto A. Earl
Attorney.

Patented May 4, 1954

2,677,447

UNITED STATES PATENT OFFICE 2,677,447

CLUTCH TRIPPING MECHANISM FOR PUNCH PRESSES AND OTHER MACHINE TOOLS

Gustaf O. Johnson, Elkhart, Ind., assignor to Johnson Machine & Press Corporation, Elkhart, Ind.

Application December 26, 1951, Serial No. 263,212

25 Claims. (Cl. 192—24)

1

This invention relates to improvements in clutch tripping mechanism for punch presses and other machine tools.

The principal objects of this invention are:

First, to provide clutch tripping or control mechanism for the clutch of a punch press or the like which is positive in operation and which will not accidentally release the clutch to permit re-engagement thereof once the clutch has been disengaged.

Second, to provide clutch tripping mechanism particularly adapted for coaction with a clutch in which the engagement and disengagement of the clutch is performed by relative angular movement between a rotating driven part and a clutch actuating element carried thereby.

Third, to provide clutch actuating mechanism in which disengagement of the clutch is effected by a latch member and in which the latch member is retracted by a separate lock member to permit re-engagement of the clutch, the lock member also functioning to lock the latch bar in operative clutch disengaging position with the clutch actuating element.

Fourth, to provide clutch tripping mechanism which is selectively adjustable for single cycle operation of the clutch or continuous operation of the machine controlled by the clutch, and in which the adjustment between single cycle and continuous operating positions is such that the mechanism will automatically return to single cycle operation should the tripping mechanism become loosened for any reason.

Fifth, to provide means for mounting a clutch disengaging latch bar so that the latch bar is yieldably cushioned to engage a rotating clutch disengaging element without undue shock to the latch bar.

Other objects and advantages pertaining to the details of my invention will be apparent from a consideration of the following description and claims.

The drawings, of which there are four sheets, illustrate a highly practical form of my clutch tripping mechanism.

2

Figure 1:
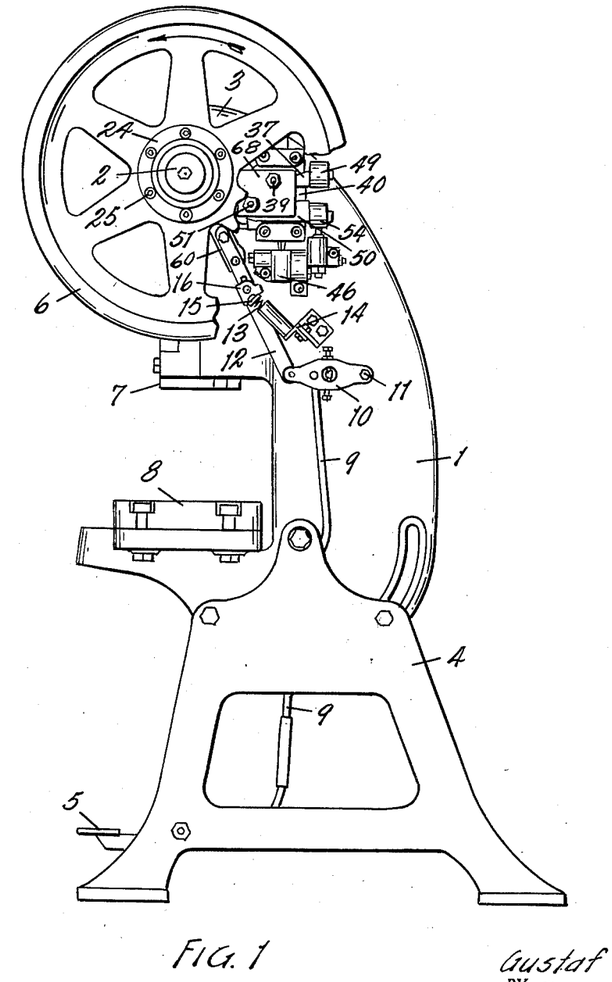
Fig. 1 is a side elevational view of a punch press with my clutch tripping mechanism operatively associated therewith.

While my clutch tripping mechanism is illustrated and described in connection with a punch press, it will be understood that the mechanism is equally effective when applied to other machine tools or mechanisms wherein it is desired to selectively control the rotation of a shaft or one driven element from a driving wheel or other driving element. The drawings illustrate a punch press having a frame 1 with a crank shaft 2 rotatably mounted at the top of the head 3 of the frame. The frame 1 is adjustably supported upon a base 4, and a foot pedal 5 is provided for selectively controlling the driving connection between the crank shaft 2 and a flywheel 6. The crank shaft is arranged to reciprocate a slide 7 relative to the bed 8 of the press in a well-known manner. The flywheel can be rotated in any of several well-known manners to operate the press.

The foot pedal 5 is connected through a trip rod 9 to a lever 10 pivotally mounted on the side of the frame at 11. The lever 10 is in turn pivotally connected to an upwardly and forwardly inclined clutch tripping bar 12, and the bar 12 is constantly urged forwardly by coil springs 13 having fixed abutments on a bracket 14 bolted to the side of the press. The springs 13 press against ears 15 on a collar 16. The collar 16 is sleeved around the tripping bar 12 and permitted limited longitudinal movement therealong by the bolt 17 which passes through a slot 18 in the tripping bar.

The clutch structure for connecting the crank shaft 2 to the flywheel 6 consists of an inner clutch member 19 (see Figs. 6 and 7), which is nonrotatably but slidably mounted on a splined spindle 20 on the outer end of the crank shaft. The inner clutch member 19 is provided with axially inwardly facing clutch teeth 21 equiangularly spaced around the clutch member and spindle. The flywheel 6 is freely rotatably supported on the spindle 20 by an inner roller bearing 22 and mounting ring 23 so as to overhang and substantially enclose the inner clutch member. The outer side of the flywheel is axially recessed to receive an inner hub member 24 nonrotatably secured to the flywheel by the screws 25, and the inner hub member is rotatably supported from the outer end of the spindle by an outer roller bearing 26. The inner hub member 24 forms a chamber enclosing the inner clutch member.

Figure 6:
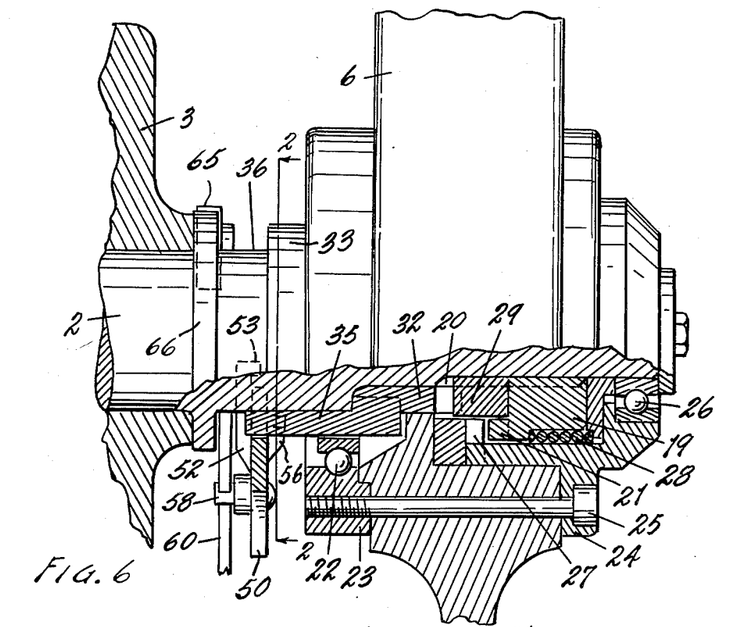
Fig. 6 is a fragmentary longitudinal cross sectional view through the flywheel, clutch and crank shaft of the press taken along the plane of the line 6—6 in Fig. 2.
Figure 7:
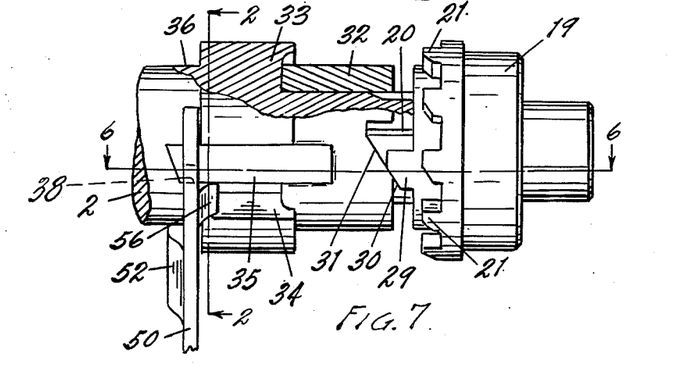
Fig. 7 is a fragmentary elevational view partially in longitudinal cross section of the end of the crank shaft with the flywheel and outer clutch parts removed to illustrate the inner driven clutch elements.

At the inner end of the inner hub member 24 and rotatable therewith are a series of axially outwardly facing driving clutch teeth 27 adapted to cooperate with the clutch teeth 21 on the inner clutch member to drivingly connect the flywheel to the crank shaft. The inner clutch member and its teeth 21 are constantly urged axially inwardly toward the driving clutch teeth 27 by a coil spring 28. Axially inward motion of the inner clutch member and teeth 21 is prevented by an annular cam follower 29 having diametrically opposed inwardly directed cam noses 30, which axially engage and slide along the axially inclined cam notches 31 formed in the outer end of a generally cylindrical cam member 32. The cam member 32 is rotatable relative to the spindle 20 of the crank shaft and is held against inward axial motion by abutment against a flange 33 extending radially from the spindle. The flange 33 is cut away in an axially extending arcuate notch 34, and a cam actuating finger 35 secured to the cam member 32 projects axially inwardly through this notch to limit relative angular rotation between the spindle and the cam member.

From the foregoing, it will be apparent that, if the cam actuating finger and cam member 32 are restrained against rotation with the spindle, the cam nose 30 of the cam follower, which rotates with the spindle, will necessarily ride up and axially outwardly along the cam surface 31 carrying with it the inner clutch member 19 and the driven teeth 21. The clutch will thus be disengaged, and with no further turning force applied to the crank shaft, the crank shaft will immediately come to rest with the cam actuating finger 35 against the trailing edge of the slot 34 in the flange 33. If the restraining force which moved the finger 35 rearwardly with respect to the crank shaft is later released, the pressure of the spring 28 acting through the inner clutch member 19 and cam follower nose 30 will cause the cylindrical cam member 32 and its finger 35 to rotate in an advancing or overtaking motion relative to the now stationary crank shaft until the follower nose 30 and clutch teeth 21 are permitted sufficient axial inward motion to re-engage the clutch teeth. Further details of the clutch mechanism are more particularly described and claimed in my copending application Serial No. 250,275 filed October 8, 1951, for Clutch for Punch Presses of which the present application is a continuation in part. My clutch tripping mechanism, which is actuated by the clutch tripping bar 12, is arranged to selectively control the relative angular motion of the cam actuating finger 35 by lateral engagement with or disengagement from the finger as the finger is rotated with the crank shaft 2. For this purpose the finger 35 projects beyond the inner side of the flange 33 into a cylindrically grooved portion 36 on the crank shaft, thus exposing the lateral sides of the finger. A latch bar 37 provided with a forward latching nose or abutment 38 is arranged to ride along the groove 36 and abut against the finger 35 unless otherwise controlled. The latch bar 37 is pivotally supported by a bolt 39 on a support plate 40. The plate 40 is horizontally slidably mounted on the side of the head 3 between a pair of guide brackets 41. The plate 40 is spaced from the side of the head 3, and the brackets 41 are vertically slotted as at 42 to permit a cushioning bar 43 to extend vertically behind the support plate 40. The cushioning bar 43 is pivotally connected to the support plate 40 by the same bolt 39 that mounts the latch bar on the support plate. The upper end of the cushioning bar 43 has a fixed pivotal connection to the side of the head at 44 and is provided with a twisted lower end 45 projecting into the spring housing 46. The housing 46 encloses and provides adjustable abutments for a pair of cushioning springs 47 and a single rebound spring 48. Thus the shock of the cam actuating finger 35 striking the abutment 38 of the latch bar 37 is cushioned by limited horizontal movement of the support plate 40 and cushioning bar 43 against the pressure of springs 47.

Figures 2, 3:
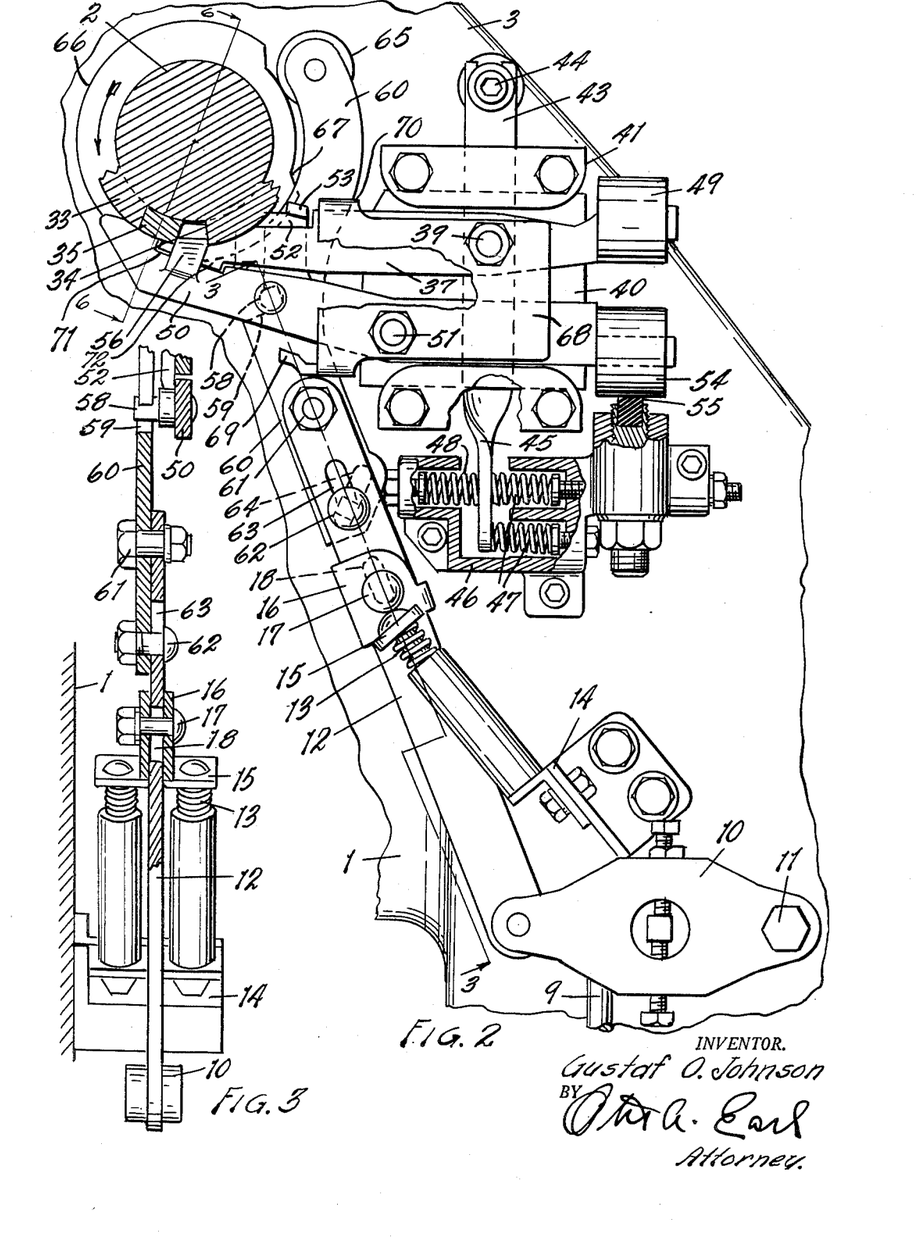
Fig. 2 is a fragmentary enlarged side elevational view of the clutch tripping mechanism with the shaft of the press partially broken away in vertical cross section along the plane of the line 2—2 in Figs. 6 and 7.
Fig. 3 is a fragmentary cross sectional view taken longitudinally through the clutch tripping bar along the plane of the line 3—3 in Fig. 2.
Figures 4, 5:
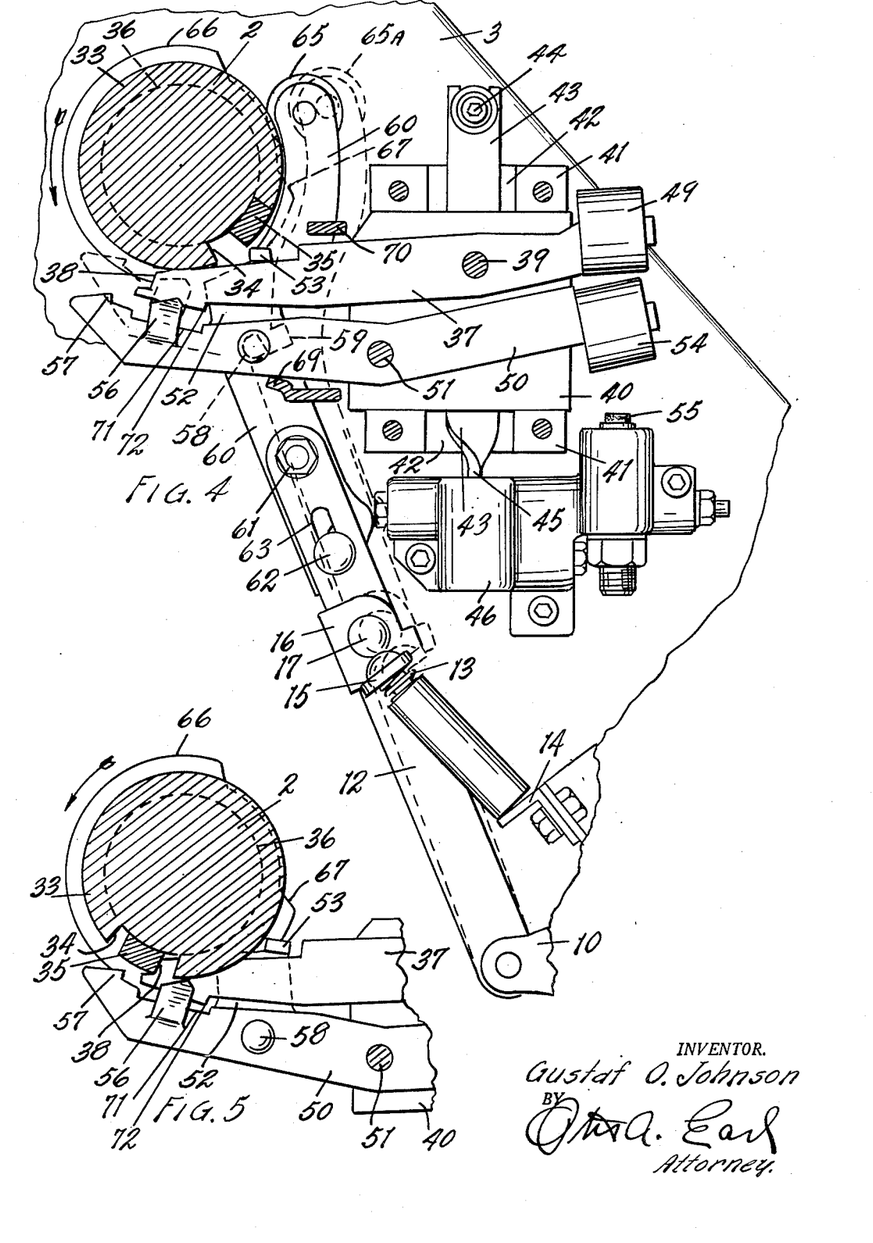
Fig. 4 is a fragmentary side elevational view similar to Fig. 2 but showing the clutch tripping mechanism in actuated clutch engaging position and with portions of the covering and guiding structure for the latch bar removed.
Fig. 5 is a fragmentary side elevational view of the clutch tripping and locking bars at the beginning of a clutch disengaging movement, the crank shaft and clutch actuating element being illustrated in cross section.

As is best illustrated in Figs. 2 and 4, the forward abutment end 38 of the latch bar 37 is constantly urged upwardly toward engaged position by a balance weight 49 on the rear end of the latch bar. The latch bar 37 is withdrawn or retracted from engagement with the finger 35 by operation of a lock bar 50. The lock bar 50 is also pivotally mounted on the support plate 40 by a bolt 51 and is generally coplanar with the latch bar. An inwardly offset ear 52 near the forward end of the lock bar is provided with an outwardly turned disengaging lug 53 which overlies the latch bar to draw the latch bar downwardly. The lock bar 50 is also biased upwardly toward the crank shaft by a counter weight 54, and the spring housing 46 includes a support for a rubber bumper 55 engageable with the counter weight 54 to cushion upward movement of the forward end of the lock bar.

Forwardly of the releasing ear 52, the lock bar 50 is provided with an outwardly projecting locking lug 56 which projects upwardly along the outer side of the latch bar 37 so that the latch bar slides vertically between the ear 52 and lug 56 on the lock bar. The locking lug 56 is of such transverse width that it will just enter and substantially fill the arcuate space in the notch 34 when the cam actuating finger 35 is moved to clutch disengaging position as is best illustrated in Fig. 2. Thus after the latch bar 37 has forced the finger 35 against the trailing edge of the slot 34, the locking lug 56 will move into the space vacated by the cam actuating finger and prevent accidental rebound of the cam actuating finger and reengagement of the clutch mechanism. The outer end of the lock bar is further provided with a finger receiving notch 57 which receives and embraces the trailing edge of the cam actuating finger 35 to further interlock the lock bar, latch bar and cam actuating finger.

To release the cam actuating finger 35 and trip the clutch to engaged position, the lock bar 50 is provided with a laterally inwardly extending bolt or pin 58 which is receivable in the downwardly and forwardly opening notch 59 formed in the forward edge of the trip bar extension member 60. The trip bar extension member 60 is pivotally secured to the upper end of the trip bar 12 as at 61 and is angularly adjustably secured thereto by a sequence selector bolt 62. The bolt 62 passes through a longitudinal slot 63 in the trip bar 12 and an oblique slot 64 in the lower end of the trip bar extension member 60. In any adjusted position of the selector bolt 62, the upper end of the trip bar extension 60 and the notch 59 therein will be urged forwardly by the springs 13 to receive the pin 58 whenever the foot pedal 5 is released.

The selective cycle features of the latch tripping mechanism are provided by a trip bar roller 65 carried by the upper end of the trip bar extension 60. The roller 65 is thus positioned to follow along a single cycle reset cam surface 66 formed around the periphery of the crank shaft when the selector bolt 62 is in the bottom of the inclined slot 64, as illustrated in Figs. 2 and 4. In this adjusted position of the mechanism, the lift 67 of the cam surface 66 will strike the roller 65 immediately after the clutch has been tripped and engaged and after the crank shaft has rotated a short distance. This will force the trip bar extension 60 and trip bar rearwardly against the compression of the springs 13 and move the notch 59 out of engagement with the trip pin 58 regardless of whether or not the foot pedal is immediately raised. The lock bar 50 and latch bar 37 are then immediately free to swing upwardly to reengage the clutch actutaing finger after the crank shaft has completed one revolution. Then in order to reengage the clutch, the operator must lift the foot pedal 5 and permit the trip bar extension 60 to move upwardly until the notch 59 will again snap forwardly over the pin 58.

With the selector bolt 62 adjusted to the upper end of the oblique slot 64, the upper end of the trip bar extension and the roller 65 are tilted backwardly into the position indicated by the dotted lines at 65A in Fig. 4. In this position the roller will be inoperative to engage the single cycle cam surface 66, and the crank shaft will continue to rotate so long as the trip pin 58 is held downwardly by the trip bar 12 and foot pedal 5. Note that it is impossible to unintentionally obtain multiple cycle or continued rotation of the crank shaft since any unintentional loosening of the selector bolt 62 will result in its falling by gravity to the single cycle position at the junction of the two slots 63 and 64.

A cover plate 68 is secured over the side of the latch bar 37 and lock bar 50 by the pivot bolts 39 and 51 and is provided with laterally inwardly turned ears 69 and 70 which form upper and lower limit stops for the latch bar and lock bar.

Particular attention is now directed to the interlocking safety features of my latch bar 37 and lock bar 50. As previously pointed out these bars are coplanar and each is pivotally mounted on the yieldably mounted support plate 40. Alongside of the locking lug 56 the lock bar 50 is provided with an upwardly opening notch 71. The forward end of the latch bar 37 is provided on its lower edge with a depending ear 72 which is interlockingly received in the notch 71 when the latch bar and lock bar are in raised clutch disengaging position. It will be noted that the pivot bolt 51 for the lock bar 50 is positioned considerably forwardly with respect to the pivot bolt 39 of the latch bar 37 so that the interlocked ear 71, notch 72 and pivot bolts 39 and 51 are triangularly arranged. The thrust line from the abutment end 38 of the latch bar to the pivot bolt 39 is approximately tangential to the shaft 2 and thrust of the clutch actuating finger 35 against the latch bar is thus directed longitudinally along the latch bar and generally parallel to the line of yielding movement of the support plate 40. The shock of the clutch finger 35 striking the latch bar is thus yieldably cushioned by the spring 47 as was previously explained. The subsequent shock of the trailing edge of the slot 34 overtaking the cam actuating finger 35 is correspondingly cushioned.

Should the shaft 2 and cam actuating finger 35 tend to rebound and move away from the latch bar 37 the ear 72 on the latch bar remains supported by the bottom of the notch 71 in the lock bar so that the latch bar cannot accidentally move to disengaged position and permit a second unintentional cycle of the clutch. The pivot bolt 51 being positioned forwardly of the pivot bolt 39 causes the lock bar to be biased upwardly to locking position with a substantially greater force than the latch bar 37 assuring locking support for the latch bar. Further the previously mentioned triangular arrangement of the pivot bolts and the locking notch 71 renders it impossible for the locking bar to be moved downwardly out of engagement with the latch bar by any force applied to the latch bar. Any downward movement of the latch bar and its depending ear 72 would simply lock more tightly in the notch 71 and prevent downward disengagement of the latch bar from the cam actuating finger 35. The locking lug 56 on the lock bar engages the leading edge of the slot 34 to prevent rebound of the shaft 2.

From the foregoing it will be seen that the latch and lock structure cannot be unintentionally moved to clutch engaging position without having forces applied thereto far in access of the designed strength of the parts to break them. The yieldable mounting of the support plate 40 prevents the application of shock loads to the latch and lock parts in a manner which might break them.

Having thus described my invention, what I claim as new and desire to secure by Letters Patent is:

1. Clutch tripping mechanism for a clutch having a laterally engageable rotatable clutch actuating element comprising, a support plate mounted for yieldable slidable motion in a plane transverse to the axis of rotation of said element, a latch bar pivotally supported on said support plate and having an abutment on one end laterally engageable with said actuating element when said latch bar is approximately parallel to the line of motion of said plate, weight means biasing said latch bar toward engaged position with said element, a depending ear on the abutment end of said latch bar, a lock bar pivotally supported on said support plate and below said latch bar, a releasing ear on said lock bar lapped along one side of said latch bar and provided with a lug overlying said latch bar, a locking ear on said lock bar lapped along the opposite side of said latch bar from said first ear with the outer edge of the locking ear lying in approximately the same plane as the abutment on said latch bar to engage the leading edge of said actuating element when said element is retracted by said latch bar, a first locking notch formed in said lock bar and engageable with the trailing side of said element when said locking ear is engaged with the leading side thereof, a second locking notch in said lock bar positioned to receive and support said ear on said latch bar, weight means biasing said lock bar to engaged position with said element and said latch bar, the pivot of said lock bar being positioned closer to said element than the pivot of said latch bar whereby the pivot points and the abutment end of said latch bar define a triangle, a trip pin projecting from said lock bar, a reciprocable and pivotally supported trip bar spring biased toward said trip pin and swingable in a plane transverse to said axis, a trip bar extension angularly adjustably secured to the swinging end of said trip bar and having a trip notch formed in one side thereof adapted to receive said trip pin, a cam follower carried by said trip bar extension, and a cam driven by said clutch and engageable with said cam follower for disengaging said trip bar extension from said pin.

2. Clutch tripping mechanism for a clutch having a laterally engageable rotatable clutch actuating element comprising, a support plate mounted for yieldable motion in a plane transverse to the axis of rotation of said element, a latch bar pivotally supported on said support plate and having an abutment on one end laterally engageable with said actuating element, means biasing said latch bar toward engaged position with said element, a lock bar pivotally supported on said support plate and below said latch bar, a releasing ear on said lock bar lapped along one side of said latch bar and provided with a lug overlying said latch bar, a locking ear on said lock bar lapped along the side of said latch bar with the outer edge of the locking ear lying in approximately the same plane as the abutment on said latch bar to engage the leading edge of said actuating element when said element is retracted by said latch bar, a locking notch formed in said lock bar and engageable with the trailing side of said element when said locking ear is engaged with the leading side thereof, means biasing said lock bar to engaged position with said element, a trip pin projecting from said lock bar, a reciprocable and pivotally supported trip bar spring biased toward said trip pin and swingable in a plane transverse to said axis, a trip bar extension angularly adjustably secured to the swinging end of said trip bar and having a trip notch formed in one side thereof adapted to receive said trip pin, and a cam follower carried by said trip bar extension and selectively engageable with a cam driven by said clutch for disengaging said trip bar extension and notch from said pin.

3. Clutch tripping mechanism for a clutch having a laterally engageable rotatable clutch actuating element comprising, a support plate mounted for yieldable motion in a plane transverse to the axis of rotation of said clutch, a latch bar pivotally supported on said support plate and having an abutment on one end laterally engageable with said actuating element, an ear on the abutment end of said latch bar, means biasing said latch bar toward engaged position with said element, a lock bar pivotally supported on said support plate and below said latch bar by a pivot spaced below said latch bar and located closer to said actuating element than the pivot of said latch bar, a releasing ear on said lock bar lapped along one side of said latch bar and provided with a lug overlying said latch bar, a locking ear on said lock bar lapped along the opposite side of said latch bar from said first ear and arranged to engage the leading edge of said actuating element when said element is retracted by said latch bar, a locking notch formed in said lock bar and positioned to supportingly receive and engage the ear on said latch bar when said locking ear is engaged with the leading side of said actuating element, means biasing said lock bar to engaged position with said element, a trip pin projecting from said lock bar, a reciprocable and pivotally supported trip bar spring biased toward said trip pin, a trip bar extension angularly adjustably secured to the swinging end of said trip bar and having a trip notch formed in one side thereof adapted to receive said trip pin, a cam follower carried by said trip bar extension, and a cam driven by said clutch and engageable with said cam follower for disengaging said trip bar extension from said pin.

4. Clutch tripping mechanism for a clutch having a laterally engageable rotatable clutch actuating element comprising, a support plate mounted for yieldable motion in a plane transverse to the axis of rotation of said clutch, a latch bar pivotally supported on said support plate and having an abutment on one end laterally engageable with said actuating element when the latch bar is approximately parallel to the line of motion of said plate, means biasing said latch bar toward engaged position with said element, an ear on the abutment end of said latch bar, a lock bar pivotally supported on said support plate at a point on the opposite side of said latch bar from said actuating element and closer to said actuating element than the pivot of said latch bar, a releasing lug on said lock bar overlying said latch bar, a locking notch formed in said lock bar and engageable with said ear on said latch bar, means biasing said lock bar to engage the notch therein with said ear on said latch bar and to supporting engagement with the abutment end thereof, a trip pin projecting from said lock bar, a reciprocable and pivotally supported trip bar spring biased toward said trip pin and having a trip notch formed in one side thereof adapted to receive said trip pin, a cam follower carried by said trip bar, and a cam driven by said clutch and engageable with said cam follower for disengaging said trip bar from said pin.

5. Clutch tripping mechanism for a clutch having a laterally engageable rotatable clutch actuating element comprising, a latch bar pivotally supported in a plane transverse to the axis of rotation of said element and having an abutment on one end laterally engageable with said actuating element, a projection on the abutment end of said latch bar, means biasing said latch bar toward engaged position with said element, a lock bar pivotally supported to swing in a plane parallel to said latch bar and on the opposite side of the latch bar from said actuating element, a releasing lug on said lock bar extending transversely of said latch bar to engage and retract said latch bar upon retraction of said lock bar, a locking notch formed in said lock bar and engageable with said projection when said latch bar is engaged with said actuating element, means biasing said lock bar towards said latch bar, said lock bar being engageable with said latch bar to hold the latter in element engaging position, a trip pin projecting from said lock bar, a reciprocable and pivotally supported trip bar spring biased toward said trip pin, a trip bar extension angularly adjustably secured to the swinging end of said trip bar and having a trip notch formed in one side thereof adapted to receive said trip pin, a cam follower carried by said trip bar extension, and a cam driven by said clutch and engageable with said cam follower for disengaging said trip bar extension from said pin.

6. Clutch tripping mechanism for a clutch having a laterally engageable rotatable clutch actuating element comprising, a latch bar pivotally supported in a plane transverse to the axis of rotation of said element and having an abutment on one end laterally engageable with said actuating element, means biasing said latch bar toward engaged position with said element, a lock bar pivotally supported to swing in a plane parallel to said latch bar, a releasing lug on said lock bar overlying said latch bar to retract said latch bar upon retraction of said lock bar, a locking notch formed in said lock bar and engageable with both sides of said element when said latch bar is engaged with the leading side thereof, means biasing said lock bar to engaged position with said element, a trip pin projecting from said lock bar, a reciprocable and pivotally supported trip bar spring biased toward said trip pin and having a trip notch formed in one side thereof adapted to receive said trip pin, and selectively operable means for reciprocating said trip bar.

7. In combination with a punch press having a crank shaft journalled therein and a flywheel rotatable on said shaft, clutch mechanism for connecting said wheel to said shaft including axially facing driving teeth carried by said wheel, and a driven clutch element axially shiftable on said shaft and having driven teeth engageable with said driving teeth, a cam member rotatable relative to said shaft and having an axially inclined cam surface, means engageable with said cam surface for imparting axial motion to said clutch member, an actuating element secured to said cam member and extending axially along said crank shaft, an axially extending segmental slot in said crank shaft receiving said actuating element to limit rotation of said cam member relative to said shaft, a latch bar pivotally supported on said press and swingable transversely of said shaft, an abutment on said latch member swingable into lateral engagement with the leading side of said actuating element, a lock bar pivotally supported on said press and swingable in a plane parallel to said latch bar, a locking notch in said lock bar positioned to receive and engage the leading and trailing edges of said actuating element when said abutment is engaged therewith, a locking lug on said lock bar swingable into the leading portion of said arcuate slot when said actuating element is held in the trailing portion thereof, said locking lug engaging said crank shaft adjacent to said slot to prevent engagement of said locking notch until said actuating element has been moved to clutch disengaging position by said latch bar, a releasing lug carried by said lock bar and engageable with said latch bar to retract the latter from said actuating element, means biasing said latch bar and said lock bar toward element engaging position, the space between the opposed ends of said releasing lug and said locking lug measured transversely of said latch bar being greater than the swing of said latch bar to permit engagement of the latch bar with the actuating element prior to engagement of the locking lug therewith, a trip bar reciprocably and pivotally supported on said press and having a laterally opening notch near the upper end thereof, a trip pin on said lock bar positioned to be received in said laterally facing notch, means biasing said trip bar laterally to engage said pin, a follower on the upper end of said trip bar positioned alongside of said crank shaft, a cam on said crank shaft engageable with said follower to tilt said trip bar and the notch therein away from said trip pin and angularly disposed on said crank shaft to release said pin and said lock bar from said trip bar after said clutch is engaged, and an adjustable connection in said trip bar for moving said follower to inoperative position relative to said cam, the pivotal supports for said latch bar and said lock bar having yieldable supporting connections to said press to cushion thrust loads applied to said lock bar and said latch bar by said actuating element.

8. In combination with a punch press having a crank shaft journalled therein and a flywheel rotatable on said shaft, clutch mechanism for connecting said wheel to said shaft including axially facing driving teeth carried by said wheel, and a driven clutch element axially shiftable on said shaft and having driven teeth engageable with said driving teeth, a cam member rotatable relative to said shaft and having an axially inclined cam surface, means engageable with said cam surface for imparting axial motion to said clutch member, an actuating element secured to said cam member and extending axially along said crank shaft, an axially extending segmental slot in said crank shaft receiving said actuating element to limit rotation of said cam member relative to said shaft, a latch bar pivotally supported on said press and swingable transversely of said shaft, an abutment on said latch member swingable into lateral engagement with the leading side of said actuating element, a lock bar pivotally supported on said press and swingable in a plane parallel to said latch bar, a locking lug on said lock bar swingable into the leading portion of said arcuate slot when said actuating element is held in the trailing portion thereof, said locking lug engaging said crank shaft adjacent to said slot to prevent engagement of said locking lug in said slot until said actuating element has been moved to clutch disengaging position by said latch bar, a releasing lug carried by said lock bar and engageable with said latch bar to retract the latter from said actuating element, means biasing said latch bar and said lock bar toward element engaging position, the space between the opposed ends of said releasing lug and said locking lug measured transversely of said latch bar being greater than the swing of said latch bar to permit engagement of the latch bar with the actuating element prior to engagement of the locking lug therewith, a trip bar reciprocably and pivotally supported on said press and having a laterally opening notch near the upper end thereof, a trip pin on said lock bar positioned to be received in said laterally facing notch, means biasing said trip bar laterally to engage said pin, a follower on the upper end of said trip bar positioned alongside of said crank shaft, a cam on said crank shaft engageable with said follower to tilt said trip bar and the notch therein away from said trip pin and angularly disposed on said crank shaft to release said pin and said lock bar from said trip bar after said clutch is engaged, and an adjustable connection in said trip bar for moving said follower to inoperative position relative to said cam, the pivotal supports for said latch bar and said lock bar having yieldable supporting connections to said press to cushion thrust loads applied to said lock bar and said latch bar by said actuating element.

9. In combination with a punch press having a crank shaft journalled therein and a flywheel rotatable on said shaft, clutch mechanism for connecting said wheel to said shaft including axially facing driving teeth carried by said wheel, and a driven clutch element axially shiftable on said shaft and having driven teeth engageable with said driving teeth, a cam member rotatable relative to said shaft and having an axially inclined cam surface, means engageable with said cam surface for imparting axial motion to said clutch member, an actuating element secured to said cam member and extending axially along said crank shaft, an axially extending segmental slot in said crank shaft receiving said actuating element to limit rotation of said cam member relative to said shaft, a latch bar pivotally supported on said press and swingable transversely of said shaft, an abutment on said latch member swingable into lateral engagement with the leading side of said actuating element, a projection on the abutment end of said latch bar, a lock bar pivotally supported on said press and swingable transversely to said shaft, a locking notch in said lock bar positioned to receive and engage the projection on said latch bar when said abutment is engaged with said actuating element, the pivot for said lock bar being positioned between the abutment end and pivot for said latch bar and spaced from a line therebetween, a locking lug on said lock bar swingable into the leading portion of said arcuate slot when said actuating element is held in the trailing portion thereof, said lock bar transversely engaging said crank shaft adjacent to said slot to prevent engagement of said locking lug in said slot until said actuating element has been moved to clutch disengaging position by said latch bar, a releasing lug carried by said lock bar and engageable with said latch bar to retract the latter from said actuating element, means biasing said latch bar and said lock bar toward element engaging position, a trip bar reciprocably and pivotally supported on said press and having a laterally opening notch near the upper end thereof, a trip pin on said lock bar positioned to be received in said laterally facing notch, means biasing said trip bar laterally to engage said pin, a follower on the upper end of said trip bar positioned alongside of said crank shaft, and a cam on said crank shaft engageable with said follower to tilt said trip bar and the notch therein away from said trip pin and angularly disposed on said crank shaft to release said pin and said lock bar from said trip bar after said clutch is engaged, the pivotal supports for said latch bar and said lock bar having yieldable supporting connections to said press to cushion thrust loads applied to said lock bar and said latch bar by said actuating element.

10. In combination with a punch press having a crank shaft journalled therein and a flywheel rotatable on said shaft, clutch mechanism for connecting said wheel to said shaft including axially facing driving teeth carried by said wheel, and a driven clutch element axially shiftable on said shaft and having driven teeth engageable with said driving teeth, a cam member rotatable relative to said shaft and having an axially inclined cam surface, means engageable with said cam surface for imparting axial motion to said clutch member, an actuating element secured to said cam member and extending axially along said crank shaft, an axially extending segmental slot in said crank shaft receiving said actuating element to limit rotation of said cam member relative to said shaft, a latch bar pivotally supported on said press and swingable transversely of said shaft, an abutment on said latch member swingable into lateral engagement with the leading side of said actuating element, a lock bar pivotally supported on said press and swingable transversely to said shaft, a locking lug on said lock bar swingable into the leading portion of said arcuate slot when said actuating element is held in the trailing portion thereof, said locking bar transversely engaging said crank shaft adjacent to said slot to prevent engagement of said locking lug in said slot until said actuating element has been moved to clutch disengaging position by said latch bar, a releasing lug carried by said lock bar and engageable with said latch bar to retract the latter from said actuating element, means biasing said latch bar and said lock bar toward element engaging position, a trip bar reciprocably and pivotally supported on said press and having a laterally opening notch near the upper end thereof, a trip pin on said lock bar positioned to be received in said laterally facing notch, means biasing said trip bar laterally to engage said pin, a follower on the upper end of said trip bar positioned alongside of said crank shaft, and a cam on said crank shaft engageable with said follower to tilt said trip bar and the notch therein away from said trip pin and angularly disposed on said crank shaft to release said pin and said lock bar from said trip bar after said clutch is engaged.

11. In combination with a machine having a crank shaft journalled therein and a flywheel rotatable on said shaft, clutch mechanism for connecting said wheel to said shaft including axially facing driving teeth carried by said wheel, and a driven clutch element axially shiftable on said shaft and having driven teeth engageable with said driving teeth, a cam member rotatable relative to said shaft and having an axially inclined cam surface, means engageable with said cam surface for imparting axial motion to said clutch member, an actuating portion on said cam member and extending radially and axially along said crank shaft, angularly spaced stops on said crank shaft engageable with said cam member to limit rotation of said cam member relative to said shaft, a latch bar pivotally supported on said machine and swingable transversely of said shaft, an abutment on said latch bar swingable into lateral engagement with the leading side of said actuating portion, a projection on the abutment end of said latch bar, a lock bar pivotally supported on said machine and swingable transversely to said shaft, a locking notch in said lock bar positioned to receive and engage the projection on said latch bar when said latch bar is in clutch disengaging position against said actuating portion, a locking lug on said lock bar swingable into the space between the leading edge of said actuating portion and said stops when said actuating portion is held in the trailing portion of the space, said locking lug engaging said crank shaft adjacent to said stops to prevent engagement of said locking lug until said actuating portion has been moved to clutch disengaging position by said latch bar, a releasing lug carried by said lock bar and engageable with said latch bar to retract the latter from said actuating portion, means biasing said latch bar and said lock bar toward engaging position with said actuating portion, a trip bar reciprocably and pivotally supported on said machine, said trip bar and lock bar having a laterally releasable pin and notch connection near the upper end of the trip bar, means biasing said trip bar laterally to engage said lock bar, a follower on the upper end of said trip bar positioned alongside of said crank shaft, and a cam on said crank shaft engageable with said follower to tilt said trip bar away from and out of engagement with said lock bar and angularly disposed on said crank shaft to release said lock bar from said trip bar after said clutch is engaged, the pivot for said lock bar being positioned between the pivot for said latch bar and said projection and spaced laterally from a line therebetween.

12. In combination with a machine having a crank shaft journalled therein and a flywheel rotatable on said shaft, clutch mechanism for connecting said wheel to said shaft including axially facing driving teeth carried by said wheel, and a driven clutch element axially shiftable on said shaft and having driven teeth engageable with said driving teeth, a cam member rotatable relative to said shaft and having an axially inclined cam surface, means engageable with said cam surface for imparting axial motion to said clutch member, an actuating portion on said cam member and extending radially and axially along said crank shaft, angularly spaced stops on said crank shaft engageable with said cam member to limit rotation of said cam member relative to said shaft, a latch bar pivotally supported on said machine and swingable transversely of said shaft, an abutment on said latch bar swingable into lateral engagement with the leading side of said actuating portion, a projection on the abutment end of said latch bar, a lock bar pivotally supported on said machine and swingable transversely to said shaft, a locking notch in said lock bar positioned to receive and engage the projection on said latch bar when said latch bar is in clutch disengaging position against said actuating portion, a releasing lug carried by said lock bar and engageable with said latch bar to retract the latter from said actuating portion, means biasing said latch bar and said lock bar toward engaging position with said actuating portion, a trip bar reciprocably and pivotally supported on said machine, said trip bar and lock bar having a laterally releasable pin and notch connection near the upper end of said trip bar, means biasing said trip bar laterally to engage said lock bar, a follower on the upper end of said trip bar positioned alongside of said crank shaft, and a cam on said crank shaft engageable with said follower to tilt said trip bar away from and out of engagement with said lock bar and angularly disposed on said crank shaft to release said lock bar from said trip bar after said clutch is engaged, the pivot for said lock bar being positioned between the pivot for said latch bar and the projection thereon and spaced laterally from a line therebetween.

13. In combination with a machine having a crank shaft journalled therein and a flywheel rotatable on said shaft, clutch mechanism for connecting said wheel to said shaft including axially facing driving teeth carried by said wheel, and a driven clutch element axially shiftable on said shaft and having driven teeth engageable with said driving teeth, a cam member rotatable relative to said shaft and having an axially inclined cam surface, means engageable with said cam surface for imparting axial motion to said clutch member, an actuating portion on said cam member and extending radially and axially along said crank shaft, angularly spaced stops on said crank shaft engageable with said cam member to limit rotation of said cam member relative to said shaft, a latch bar pivotally supported on said machine and swingable transversely of said shaft, an abutment on said latch bar swingable into lateral engagement with the leading side of said actuating portion, a lock bar pivotally supported on said machine and swingable transversely to said shaft, a locking lug on said lock bar swingable into the space between the leading portion of said cam member and said stops when said cam member is held in the trailing portion of the space, said locking lug engaging said crank shaft adjacent to said stops to prevent engagement of said locking lug until said actuating portion has been moved to clutch disengaging position by said latch bar, a releasing lug carried by said lock bar and engageable with said latch bar to retract the latter from said actuating portion, means biasing said latch bar and said lock bar toward engaging position with said actuating portion, said lock bar supportingly engaging said latch bar in the clutch disengaging position thereof to hold said bars in clutch disengaging position, a trip bar reciprocably and pivotally supported on said machine and having a laterally releasable pin and notch connection near the swinging end thereof with said lock bar, means biasing said trip bar laterally to engage said lock bar, a follower on the upper end of said trip bar positioned alongside of said crank shaft, and a cam on said crank shaft engageable with said follower to tilt said trip bar away from and out of engagement with said lock bar and angularly disposed on said crank shaft to release said lock bar from said trip bar after said clutch is engaged.

14. In combination with a machine having a rotatable shaft and a coaxial rotatable driving member, a clutch for connecting said driving member to said shaft including an actuating element angularly rotatable with respect to said shaft, a clutch disengaging latch bar pivotally mounted on said machine to swing into clutch disengaging engagement with said element, means for retracting said latch bar from said element including a lever swingably supported on said machine and engageable with said latch bar to retract the latter, a pin projecting from said lever, means for moving said pin radially of said shaft to retract said latch bar including a reciprocable trip bar, means biasing said trip bar axially and laterally toward said pin, a trip bar extension angularly adjustably secured to said trip bar and extending alongside of said pin and said shaft, a laterally opening notch in said trip bar extension positioned to receive and engage said trip pin and movable with said trip bar to actuate said pin, a follower carried by said trip bar extension, a cam on said shaft positioned to engage said follower and move said trip bar extension laterally out of engagement with said pin, and means including a bolt passed through obliquely intersecting slots in said trip bar and said trip bar extension for selectively clamping said trip bar extension to said trip bar in relative angularly adjusted position whereby said follower is moved out of the path of said cam.

15. In combination with a machine having a rotatable shaft and a coaxial rotatable driving member, a clutch for connecting said driving member to said shaft including an actuating element angularly rotatable with respect to said shaft, a clutch disengaging latch bar pivotally mounted on said machine to swing into clutch disengaging lateral engagement with said element, means for retracting said latch bar from said element including a pin swingably supported on said machine and connected to said latch bar, means for moving said pin radially of said shaft to retract said latch bar including a reciprocable trip bar, means biasing said trip bar axially and laterally toward said pin, a trip bar extension angularly adjustably secured to said trip bar and extending alongside of said pin and said shaft, a laterally opening notch in said trip bar extension positioned to receive and engage said trip pin and movable with said trip bar to actuate said pin, a follower carried by said trip bar extension, a cam on said shaft positioned to engage said follower and move said trip bar extension laterally out of engagement with said pin, and means for clamping said trip bar extension to said trip bar in relative angularly adjusted position whereby said follower is moved out of the path of said cam.

16. In combination with a machine having a driven crank shaft and a driving clutch mounted thereon, means for engaging and disengaging said clutch comprising, a clutch actuating element rotatable with said crank shaft and being limitedly rotatable with respect thereto, a carrier plate slidably mounted on said machine for motion in a plane transverse to said crank shaft, a cushion bar having a fixed pivotal connection to said machine and a movable pivotal connection to said carrier plate, springs forming cushion means laterally engageable with the swinging end of said cushion bar, a latch bar pivotally supported on said carrier plate to swing in a plane transverse to said crank shaft to present the end of the latch bar to the side of said element, a projection on said latch bar positioned between its pivot and its element engaging end, a lock bar pivotally supported on said carrier plate to swing in a plane parallel to said latch bar and having a locking notch arranged to embrace said projection when said latch bar is in engagement with said element, a lost motion transversely interlocking connection between said lock bar and said latch bar, trip means engageable with said lock bar to angularly retract said lock bar and said latch bar from engagement with said element, and means separately biasing said bars toward said clutch actuating element.

17. In combination with a machine having a driven crank shaft and a driving clutch mounted thereon, means for engaging and disengaging said clutch comprising, a clutch actuating element rotatable with said crank shaft and being limitedly rotatable with respect thereto, a carrier plate slidably mounted on said machine for motion in a plane transverse to said crank shaft, a cushion bar having a fixed pivotal connection to said machine and a movable pivotal connection to said carrier plate, cushion means laterally engageable with the swinging end of said cushion bar, a latch bar pivotally supported on said carrier plate to swing in a plane transverse to said crank shaft to present the end of the latch bar to the side of said element, a lock bar pivotally supported on said carrier plate to swing transversely to said shaft and having a locking notch arranged to embrace said element, a lost motion transversely interlocking connection between said lock bar and said latch bar, trip means engageable with said lock bar to retract said lock bar and said latch bar from engagement with said element, and means separately biasing said bars towards said clutch actuating element.

18. In combination with a machine having a crank shaft and a clutch mounted thereon, means for engaging and disengaging said clutch comprising, a clutch actuating element rotatable with said crank shaft and being limitedly rotatable with respect thereto, a latch bar pivotally supported on said machine to swing in a plane transverse to said crank shaft to present an edge of the latch bar in stopping engagement to the side of said element, a lock bar pivotally supported on said machine to swing transversely to said shaft, a lost motion transversely interlocking connection between said lock bar and said latch bar, trip means engageable with said lock bar to retract said lock bar and said latch bar from engagement with said element, and means separately biasing said bars towards said clutch actuating element.

19. In combination with a machine having a crank shaft and a clutch mounted thereon, means for engaging and disengaging said clutch comprising, a clutch actuating element rotatable with said crank shaft and being limitedly rotatable with respect thereto, a latch bar pivotally supported on said machine to swing in a plane transverse to said crank shaft to present an edge of the latch bar in stopping engagement to the side of said element, a lock bar pivotally supported on said machine to swing transversely to said shaft and having a locking lug arranged to enter between said element and a radially extending surface on said crank shaft in the clutch disengaged position of said element, a lost motion transversely interlocking connection between said lock bar and said latch bar, trip means engageable with said lock bar to retract said lock bar and said latch bar from engagement with said element, and means separately biasing said bars toward said clutch actuating element.

20. In combination with a punch press having a shaft member journalled therein and a flywheel member rotatable on said shaft member, clutch mechanism for connecting said members including axially facing teeth carried by one of said members, and an axially shiftable clutch element on the other of said members having teeth engageable with said other teeth, a cam member rotatable with and relative to said shaft member and having an axially inclined cam surface, means engageable with said cam surface for imparting axial motion to said clutch element, an actuating element secured to said cam member and extending axially along said crank shaft, an axially extending segmental slot in said crank shaft receiving said actuating element to limit rotation of said cam member relative to said shaft, a latch bar pivotally supported on said press and swingable transversely of said shaft, an abutment on said latch bar swingable into lateral engagement with the leading side of said actuating element, a lock bar engageable with the leading edge of said actuating element when said abutment is engaged therewith and pivotally mounted on said press to swing into locking lateral engagement with said latch bar to hold said abutment against said element, means separately biasing said latch bar and said lock bar transversely toward element engaging position, means forming a lost motion connection between said bars upon swinging motion thereof whereby retraction of said lock bar from said actuating element will also retract said latch bar, a trip bar reciprocably and pivotally supported on said press and extending transversely of said lock bar, means including a pin and coacting slot forming a driving connection between said trip bar and said lock bar for transverse retraction of said lock bar upon vertical depression of said trip bar, said pin being disengageable from said slot by lateral movement of said trip bar, means biasing said trip bar laterally to engage said pin with said slot, a follower on the upper end of said trip bar positioned alongside of said crank shaft, a cam on said crank shaft engageable with said follower to tilt said trip bar and disengage said pin from said slot and angularly disposed on said crank shaft to release said pin after said clutch is engaged, and an adjustable connection in said trip bar for moving said follower to inoperative position relative to said cam, the pivotal supports for said latch bar and lock bar being spaced from each other and having a yieldable supporting connection to said press to cushion thrust loads applied to said bars by said actuating element.

21. In combination with a punch press having a shaft member journalled therein and a flywheel member rotatable on said shaft member, clutch mechanism for connecting said members including axially facing teeth carried by one of said members, and an axially shiftable clutch element on the other of said members having teeth engageable with said other teeth, a cam member rotatable with and relative to said shaft member and having an axially inclined cam surface, means engageable with said cam surface for imparting axial motion to said clutch element, an actuating element secured to said cam member and extending axially along said crank shaft, an axially extending segmental slot in said crank shaft receiving said actuating element to limit rotation of said cam member relative to said shaft, a latch bar pivotally supported on said press and swingable transversely of said shaft, an abutment on said latch bar swingable into lateral engagement with the leading side of said actuating element, a lock bar pivotally mounted on said press at a point spaced from the pivot of said latch bar and swingable into locking engagement with said latch bar to hold said abutment against said element, means separately biasing said latch bar and lock bar transversely toward element engaging position, means forming a lost motion connection between said bars upon swinging motion thereof whereby retraction of said lock bar from said actuating element will also retract said latch bar, a trip bar reciprocably and pivotally supported on said press and extending transversely of said lock bar, means including a pin and coacting slot forming a driving connection between said trip bar and said lock bar for transverse retraction of said lock bar upon vertical depression of said trip bar, said pin and slot being disengageable by lateral movement of said trip bar, and means biasing said trip bar laterally to engage said pin with said slot.

22. In combination with a machine having a driven crank shaft and a clutch mounted thereon, means for engaging and disengaging said clutch comprising, a clutch actuating element rotatable with said crank shaft and being limitedly rotatable with respect thereto, a latch bar pivotally supported on said machine to swing in a plane transverse to said crank shaft to present an edge of the latch bar in stopping engagement to the side of said element, a trip bar extending transversely of said latch bar and movable transversely and longitudinally with respect thereto, means forming a pin and slot connection connecting said trip bar to said latch bar transversely of said latch bar, said connection being releasable by transverse movement of said trip bar longitudnially of said latch bar, and cam means on said shaft engageable with said trip bar to move said trip bar transversely and disengage said connection.

23. In combination with a punch press having a crank shaft with a driving wheel rotatably mounted thereon, clutch mechanism for connecting said wheel to said shaft including a clutch actuating element rotatable with said shaft and having an axially extending actuating finger capable of limited rotation relative to said shaft to engage and disengage the clutch, a first bar pivotally mounted on said press and swingable transversely of said shaft, an abutment surface on the swinging end of said bar swingable into the path of said finger to engage and stop the same, means biasing said first bar toward said finger, a locking lug projecting from the side of said bar, a second bar pivotally mounted on said press and swingable transversely of said shaft to supportingly engage said first bar at an angle when said first bar is engaged with said finger, a notch formed in said second bar receiving said locking lug in the engaged positions of said bars, means biasing said second bar toward said finger with greater force than said first bar, a reciprocably and tiltably supported trip bar on said press extending transversely of said second bar, means forming a driving connection between said trip bar and said second bar transversely of said second bar to retract said second bar upon longitudinal movement of said trip bar, said connection being laterally disengageable by tilting of said trip bar, and means forming a lost motion connection between said first and second bars and transversely thereof to retract said first bar upon retracting motion of said second bar.

24. In combination with a punch press having a crank shaft with a driving wheel rotatably mounted thereon, clutch mechanism for connecting said wheel to said shaft including a clutch actuating element rotatable with said shaft and having an axially extending actuating finger capable of limited rotation relative to said shaft to engage and disengage the clutch, a first bar pivotally mounted on said press and swingable transversely of said shaft, an abutment surface on the swinging end of said bar swingable into the path of said finger to engage and stop the same, means biasing said first bar toward said finger, a second bar pivotally mounted on said press and swingable transversely of said shaft to supportingly engage said first bar at an angle when said first bar is engaged with said finger, means biasing said second bar toward said finger, a reciprocably and tiltably supported trip bar on said press extending transversely of said second bar, means forming a driving connection between said trip bar and said second bar transversely of said second bar to retract said second bar upon longitudinal movement of said trip bar, said connection being laterally disengageable by tilting of said trip bar, and means forming a lost motion connection between said first and second bars and transversely thereof to retract said first bar upon retracting motion of said second bar.

25. In combination with a machine having a shaft with a driving wheel rotatably mounted thereon, clutch mechanism for connecting said wheel to said shaft and including a clutch actuating element rotatable with said shaft and having two opposed parallel axially extending actuating surfaces spaced angularly therearound capable of limited rotation relative to said shaft upon engaging and disengaging motion of the element, a bar pivotally mounted on said press and swingable transversely of said shaft, an abutment surface on the swinging end of said bar swingable into the path of one of said surfaces to oppose rotation of the same, a locking surface formed on said bar and engageable with the other of said actuating surfaces in opposition to said abutment surface, and trip means transversely engageable with and movable relative to said first bar to retract said first bar from said shaft.

References Cited in the file of this patent

UNITED STATES PATENTS

| Number | Name | Date |
|---|---|---|
| 620,659 | Leavitt | Mar. 7, 1899 |
| 1,430,722 | Cameron | Oct. 3, 1922 |
| 1,810,317 | Lasker | June 16, 1931 |
| 2,060,175 | Carleton | Nov. 10, 1936 |
| 2,230,838 | Hawkins | Feb. 4, 1941 |
| 2,475,749 | Martin et al. | July 12, 1949 |
| 2,559,117 | Folk | July 3, 1951 |
| 2,568,249 | Nilson et al. | Sept. 18, 1951 |